United States Patent [19]

Okunishi et al.

[11] 4,112,732
[45] Sep. 12, 1978

[54] METHOD AND APPARATUS FOR SHAPING INTEGRALLY-SHAPED TYPE BRAKE DISKS FOR CARS

[75] Inventors: Hiromu Okunishi, Sayama; Hideki Nakaji, Kawagoe; Hiroyuki Suwa, Sayama; Hideaki Sato, Kawagoe, all of Japan

[73] Assignee: Honda Giken Kogyo Kabushiki Kaisha, Tokyo, Japan

[21] Appl. No.: 789,013

[22] Filed: Apr. 20, 1977

[30] Foreign Application Priority Data

Apr. 28, 1976 [JP] Japan .................................. 51-48962

[51] Int. Cl.$^2$ ............................................. B21J 13/02
[52] U.S. Cl. ........................................ 72/334; 72/342; 72/354; 148/12.4
[58] Field of Search ................. 72/309, 313, 334, 342, 72/350, 354, 356, 359, 397, 399; 148/12.4; 29/159.01

[56] References Cited

U.S. PATENT DOCUMENTS

| 1,457,772 | 6/1923 | Forsyth | 148/12.4 |
| 1,849,670 | 3/1932 | Glasner et al. | 72/336 |
| 2,118,018 | 5/1938 | Swanson | 73/342 |
| 2,744,746 | 5/1956 | Batz | 148/12.4 |
| 3,410,127 | 11/1968 | Burns | 72/359 |
| 3,668,917 | 6/1972 | Komatsu et al. | 148/12.4 |

*Primary Examiner*—Lowell A. Larson
*Attorney, Agent, or Firm*—Irving M. Weiner

[57] ABSTRACT

An apparatus and method for forming an integrally-shaped brake disk for a vehicle. The method comprises heating the brake disk material, and maintaining the material heated while it is inserted between upper and lower dies of the apparatus. The central and outer peripheral portions of the material are pressed and held. The intermediate portion between the central and outer peripheral portions is drawn and shaped by relative motion between the dies. The material is continuously quenched while it is maintained pressed and held.

13 Claims, 7 Drawing Figures

METHOD AND APPARATUS FOR SHAPING INTEGRALLY-SHAPED TYPE BRAKE DISKS FOR CARS

The invention relates to methods and apparatus for shaping integrally-shaped type brake disks for vehicles.

More particularly, the invention relates to a method for shaping integrally-shaped type brake disks wherein, in shaping a brake disk by heating a sheet material, setting it between upper and lower dies and press-shaping and quenching it, the annular flange portion and hub fitting portion required to have a precision in flatness and parallelism are held, pressed and fixed between the upper and lower dies, and the dies on one side holding and pressing either flange portion or hub fitting portion are moved in the vertical direction to draw and shape the intermediate portion of the material, and an apparatus for performing such method.

BACKGROUND OF THE INVENTION

Disk brakes are so excellent in stability at high speeds and high loads that they have recently been used not only for automobiles, but also for autobicycles or motorcycles.

It is necessary to heat-treat such a brake disk to a required hardness for brake feeling, wear-resistance, anticorrosion, and prevention of the metallic sound, i.e., the squeaking of the brake caused by friction at the time of braking. Together with such hardness control, the flatness and parallelism of the annular disk portion and hub fitting portion forming brake pad sliding surfaces are required to have great precision. The portion having holes, such as holes for fitting the brake disk and an axle inserting hole, is also required to have great precision.

There is a type in which the annular disk portion and hub fitting portion are separately shaped and then combined to be integral with each other, and a type in which both portions are integrally shaped from one sheet of material. Both types are selectively used depending on the size of the vehicle or the like. However, the latter type in which both portions are integrally shaped is very advantageous to manufacture and costs are minimized, but has the following problems in satisfying the above-mentioned conditions in its manufacture.

Generally, when a brake disk is adopted for an autobicycle, from the requirements in weight reduction and design, a plurality of window holes are made by punching or the like on the periphery of the truncated conical intermediate portion drawn and shaped between the annular disk portion and hub fitting portion. Also, on the hub fitting surface, a plurality of holes for fitting the disk to the hub are made, and a hole for inserting the axle or axle boss is made.

In the conventional shaping of such a brake disk, the integrally shaped brake disk is drawn and shaped with drawing dies while being pressed in the annular disk portion on its outer periphery with pressing dies. As the brake disk is drawn and shaped while being pressed on the annular disk portion at the time of shaping, the truncated conical intermediate portion between the hub fitting portion and this annular portion will be pulled in the peripheral direction to be thin and, at the same time, this pulling action will also influence the hub fitting portion. As a result, the hub fitting holes and axle inserting hole made in advance by punching or the like in the hub fitting portion will be distorted. The hub fitting surface will also deviate from its uniformity. Therefore, after the shaping, it is necessary to correct and mechanically work the holes and hub fitting surface. It is very difficult to thus mechanically work a shaped product made by being quenched simultaneously with the abovementioned shaping, and high in surface hardness. It is not desirable in workability and mass-productivity including the problems of the severability and tool life, and defeats the requirement of the reduction of cost of the brake disk. Not only in the case of forming the above-mentioned hub fitting portion in advance as in the above, but also in the case of shaping it by simultaneously punching and drawing it, the hub fitting surface will slip, the shaped holes will be deformed, and thus the same corrections mentioned above will be required. As a result of such corrections, the precision of fitting the brake disk will decrease, the pad and annular disk portion will be partially worn, the wear will be accelerated, or the brake performance will decrease.

Therefore, in a brake disk, it is very important that not only the precision in flatness and parallelism of the annular disk portion forming pad sliding surfaces, but also the precision of fitting the hub fitting portion, is kept high. It is desirable that the fitting holes shaped in the hub portion are kept at a high precision. In shaping the brake disk, it is more favorable to production and mass-production in addition to the above to require no correcting work.

SUMMARY OF THE INVENTION

The present invention provides a method for forming an integrally-shaped brake disk for a vehicle. The method includes the steps of heating a brake disk material to a predetermined temperature, and maintaining the material heated while inserting the heated material between and upper and lower dies of a brake disk forming apparatus. The central and outer peripheral portions of the material are pressed and held. The intermediate portion between the central and outer peripheral portions is drawn and shaped by relative motion between predetermined ones of such dies while the central and outer peripheral portions of the material are maintained pressed and held. The material is continuously quenched while it is maintained pressed and held.

An object of the invention is to provide an apparatus and a method of shaping integrally-shaped type brake disks high in precision and quality wherein the precision of the parallelism and flatness of the hub fitting portion as well as the annular disk portion is kept high in the shaping, and any work to correct the surfaces and hole portions is not required.

The invention provides a method and apparatus wherein the above-mentioned method is worked by using both press-shaping and press-quenching so that a brake disk may be produced simply at high productivity, while satisfying various performances as of a brake disk high in precision and quality.

Particularly, according to the invention, in shaping an integrally-shaped type brake disk, the annular disk portion and hub fitting portion required to have a high precision in parallelism and flatness of the material are strongly pressed with upper and lower dies, and are hot-drawn as held and pressed. At the time of this shaping, either set of the upper and lower dies is moved relative to one another while maintaining the strongly holding and pressing state. The portion required to have the precision in parallelism and flatness is drawn and shaped by relative motion of the held and pressed portion. At the time of this shaping, such action as slipping and pulling the uniform surface of the held and pressed portion will be prevented, and precision in parallelism and flatness of the held and pressed portion will be kept high. Even if the hub fitting portion is punched, as the intermediate portion is drawn and shaped by the relative movement of the dies while said hub fitting portion is held and pressed, any deformation of the holes will be effectively prevented. According to the invention, an integrally-shaped type brake disk of a high precision in which precision in flatness and parallelism of the annular disk portion and hub fitting portion can be kept high, the fitting holes are not deformed or slipped, and no subsequent correcting work is required, can be obtained.

The shaping apparatus of the invention is provided with dies for holding and pressing the annular disk portion in the outer peripheral portion and dies for holding and pressing the hub fitting portion in the central portion. At least one set of such dies moves relative to the other set to draw and shape the intermediate portion of the material between the dies. The dies are provided with cooling means to press-quench the material.

The upper and lower dies forming the above-mentioned dies are provided with projections displaced in the radial direction. Thus, the outer peripheral portion, central portion, and intermediate portion between them of the material are held and pressed. The intermediate portion is distinctly sectioned from the other portions. The outer peripheral portion and central portion of the material are sectioned and shaped at the time of drawing and shaping the intermediate portion to prevent any deformation of the outer peripheral portion and central portion.

DETAILED DESCRIPTION

Figure 5:
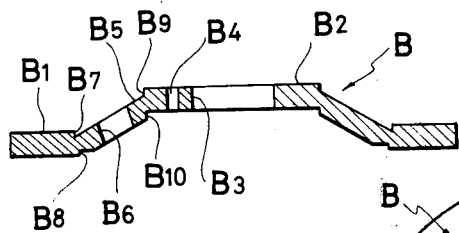
FIG. 5 is a vertical sectioned view of a shaped product.
Figure 7:
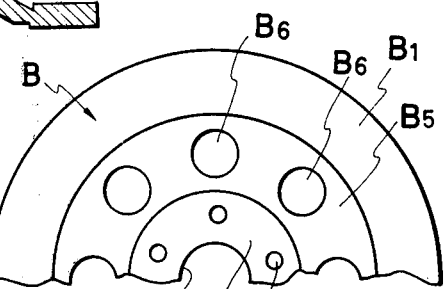
FIG. 7 is a partial plan view of the shaped product.

The shaping method according to the present invention is to obtain an integrally-shaped type brake disk as shown in FIGS. 5 and 7. In these drawings, a brake disk 7 indicated by B consists of an outer peripheral annular disk portion $B_1$, and a central hub fitting portion $B_2$ parallel to $B_1$. An axle inserting hole $B_3$ is made in the center of portion $B_2$. A plurality of hub fitting holes $B_4$ are made radially between the outer peripheral portion of portion $B_2$ and a truncated conical intermediate portion $B_5$ provided between portions $B_1$ and $B_2$ to connect them together. A plurality of window holes $B_6$ are formed, as required, for weight reduction or decoration in the intermediate portion $B_5$. The brake disk is shaped integrally from one sheet of material.

The material to be shaped may be: a material in which the above-mentioned holes are shaped by punching in advance; a material in which the holes other than the holes required to have a high precision in dimension and position are shaped by punching; or a material not yet punched and shaped.

The material is heated to a quenching temperature or preferably to a heating temperature range determined in accordance with the hardness required for the brake disk. While kept heated, this heated material is inserted between upper and lower dies, is strongly pressed in the portions required to have a precision in parallelism and flatness, such as the annular disk portion and hub fitting portion, and is drawn as it is to be shaped in the intermediate portion by moving in the vertical direction either the dies strongly pressing the hub fitting surface, or the dies strongly pressing the annular disk portion.

The outer peripheral portion and central portion of the material are held pressed, and are moved relative to one another in the vertical direction to draw and shape the intermediate portion between them.

Together with the above, the hub fitting holes and axle inserting hole may be shaped by punching. While kept pressed, after the end of the above, the material is continuously quenched.

In the above shaping, in consideration of the quenching at the time of shaping, the material to be shaped is preferably a material with which the hardness required for the brake disk is immediately obtained.

Generally, the material is a stainless steel, carbon steel, or spring steel. The material is heated to a quenching temperature, is shaped and quenched, and is then annealed to be controlled to have an HRC (Rockwell hardness on scale C) of 30 to 40 required for a brake disk. With this, even if the precision in parallelism and flatness is set to be high at the time of shaping and quenching, and the punching is made at a high precision, the material will be deformed by thermal strain or the like by the annealing and, as a result, correcting work will be required.

A feature of the invention is that it is desirable and preferable to shape and quench the material under the material and temperature conditions from which the hardness required for a brake disk is obtained with only quenching.

In consideration of the above, the present inventors have already suggested a brake disk made of a material which is a martensitic stainless steel and contains more than 10% Cr, and a method of obtaining it.

When this material is quenched at the general quenching temperature, its hardness will be an HRC of 46 to 56 which is too high for a brake disk. When the feeling characteristic, wear-resistance and prevention of squeaking sound of the brake are considered, the hardness required for a brake disk is preferably an HRC of 30 to 40. By quenching the material under such temperature condition lower than the general quenching temperature, as, e.g., at a temperature of 850° to 910° C, with a stainless steel of 12 to 0.3% C, a hardness of an HRC of 30 to 45 optimum for a brake disk is obtained.

The Cr is made more than 10% because with any lower percentage thereof a practical sufficient anticorrosion will be hard to obtain. When the above-mentioned martensitic stainless steel plate material is heated to an imperfectly quenching temperature condition, lower than the general quenching temperature condition, i.e., to a temperature set for the hardness required for a brake disk, and is quenched together with the above-mentioned shaping, a shaped product set to the contour and hardness required for a brake disk is obtained.

When the material and temperature conditions are set together with the above-mentioned shaping, a brake disk high in precision and quality and practically sufficiently satisfying the performances for a brake disk is immediately obtained with only polishing the surface required for the product and painting the fitting surface.

A shaping method and apparatus of the invention are concretely explained hereinbelow.

Figure 1:
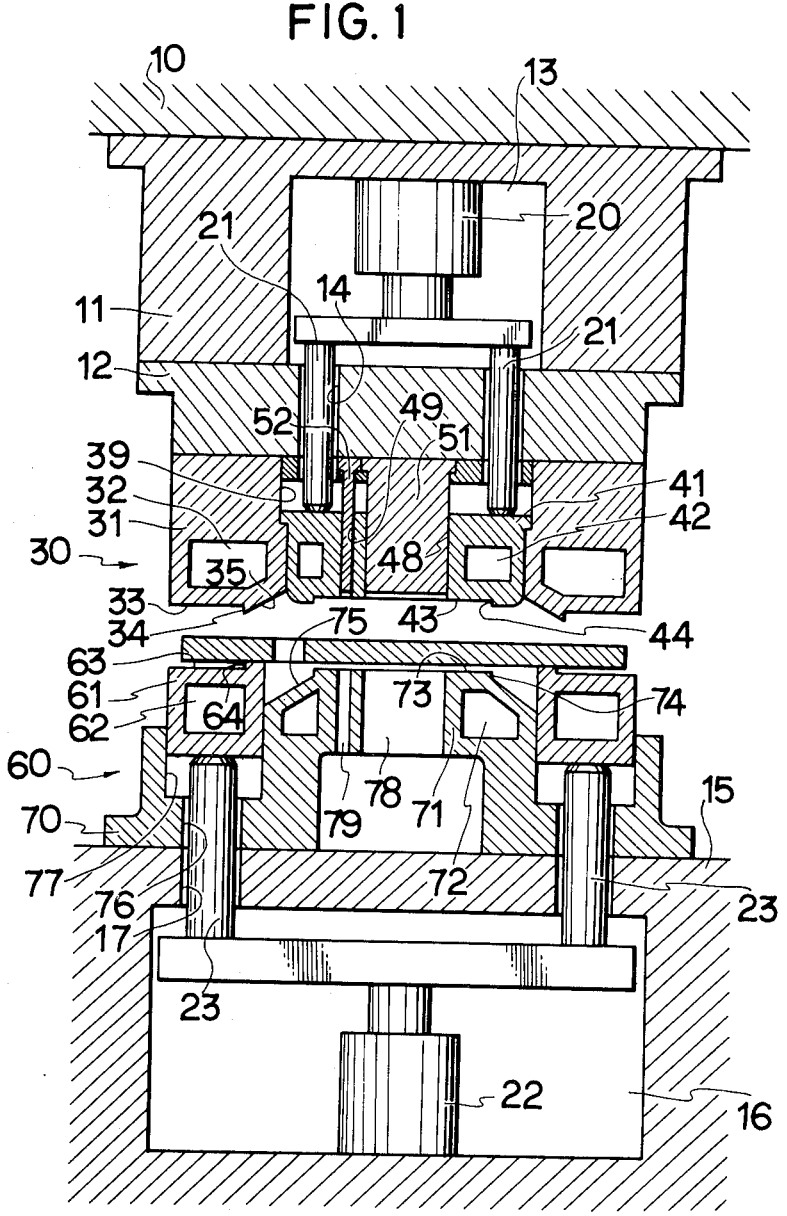
FIG. 1 is a vertical elevational section of an apparatus for working the shaping method according to the invention, showing a material as put in and set.
Figure 2:
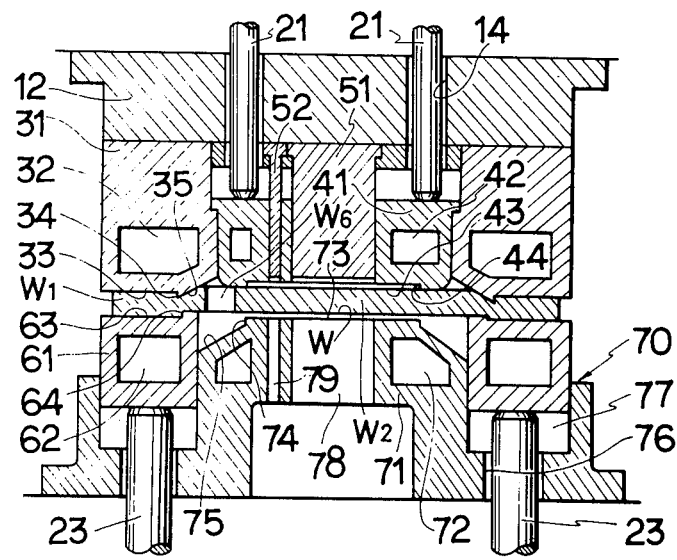
FIGS. 2 and 3 are views of only an essential part of FIG. 1, showing the sequence of shaping.

FIGS. 1 to 4 show a shaping method according to the invention in the order of the steps. The scheme of the entire apparatus is shown in FIG. 1.

The apparatus consists of an upper die 30 and a lower die 60, and the outer peripheral portion of each die has a movable die.

Upper die 31 of the outer peripheral portion is connected with elevating means, such as a ram, through vertically provided holders 11 and 12. Die 31 is provided with a cooling water passage 32 within it, and is formed to be ring-shaped. Die 31 has an upper die 41 in its central portion fitted slidably in the vertical direction within a circular space 39 in the center of it. Central upper die 41 is pressed with downwardly extended pressing rods 21 moved to rise and fall with an oil pressure cylinder 20 provided in a hollow 13 of holder 11. Rod 21 passes through a vertically provided hole 14, and contacts at its lower end with die 41. Die 41 engages with the inner peripheral portion of die 31 through a stepped part or the like, is held in a predetermined position, and is provided with a cooling water passage 42 within it.

Die 41 is provided with a punch 51 for shaping an axle inserting hole in the center, and with a plurality of punches 52 for shaping hub fitting holes radially on the outer periphery of punch 51. Each of the punches is fitted in its base part to holder 12 to rise and fall integrally with die 30. Die 41 is fitted with punches 51 and 52 through holes 48 and 49.

A flat horizontal pressing surface 33 is formed on the lower surface of die 31, and a projection 34 is provided to project vertically to surface 33 on the inner periphery of it. Projection 34 is ridge-shaped and is inclined in the form of a female taper toward the inner periphery of die 31, and upwardly from its lower end to form a tapered draw-shaping surface 35 continued with the top end portion of projection 34.

The lower surface of die 41 is a flat horizontal pressing surface 43. A projection 44 is provided on the outer periphery of surface 43 to project downwardly vertical to it to surround it.

Die 60 is opposite to die 30 and consists of a movable die 61 and a fixed die 70 which is also a holder for die 61. The outer peripheral lower die 61 is a movable die, and is ring-shaped. Die 61 is provided with a cooling water passage 62 within it, and is fitted vertically slidable in a ring-shaped groove 77 in the outer peripheral portion of die 70. Die 61 is supported on its lower surface by vertically provided supporting rods 23 of an oil pressure cylinder 22 set in a hollow of a base 15. Rods 23 reach groove 77 through holes 17 in base 15 and through holes 76 in die 70. Rods 23 support die 61 and form a die cushioning unit.

A horizontal flat pressing surface 63 is formed on the upper surface of die 61 parallel to surface 33, and a projection 64 is provided on the inner peripheral part of surface 63 to be vertical to it. Projection 64 is provided in a position displaced slightly inwardly in the radial direction from projection 34.

A fixed central lower die 71 is provided in the central portion of die 70. The upper surface of the central portion of die 71 is provided with a horizontal flat pressing surface parallel to surface 43. A stepped part 74 is formed vertically on the outer peripheral portion of surface 73. A drawing surface 75 in the form of a male taper continued diagonally downwardly and toward the outer periphery is formed in the outer peripheral portion of part 74, and is opposed to drawing surface 35. Die 71 is formed as a small male taper made flat on its upper surface, is provided with a cooling water passage 72 within it, and is provided with holes 78 and 79 opposite punches 51 and 52 in its central portion.

To obtain the hardness required for a brake disk, the abovementioned material is heated at a quenching temperature lower than the general quenching temperature, i.e., in an imperfectly quenching temperature range, is put on die 60 as thus kept heated, and is set in a predetermined position. In the illustrated embodiment, the material W is cut in advance to predetermined dimensions to be disk-shaped. Material W has holes $W_6$ (FIG. 2) forming the holes $B_6$ shaped by punching in advance in the drawn shaped portion, is heated under the above-mentioned conditions, and is put in the apparatus.

Material W put into dies 30 and 60 is supported on the lower surface on the inner peripheral side of the outside portion $W_1$ forming disk portion $B_1$ by projection 64. As material W is supported by projection 64 and is mounted and set separated from surface 63, the heated material W is prevented from being cooled. The progress of the surface hardening by the cooling of material W can be prevented and the material as kept heated can be put in between the upper and lower dies to be easy to hot-shape.

Figure 6:
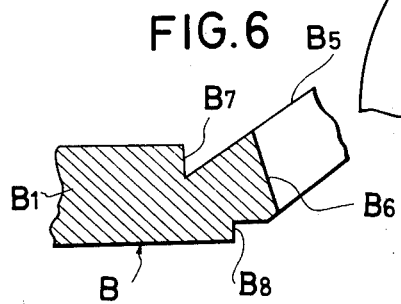
FIG. 6 is a magnified view of an essential part of FIG. 5.

Die 30 is lowered and portion $W_1$ is first strongly pressed between surfaces 33 and 63 and held. Projections 34 and 64 bite into the upper and lower surfaces of a first boundary part of material W on the inner peripheral portion of portion $W_1$ to plastically deform portion $W_1$ while hot. A step part $B_7$ (FIG. 6) vertical to the front surface side, and a step part $B_8$ vertical to the back surface side, will be formed on the inner surface of portion $B_1$.

In such state (FIG. 2), the central portion of material W will not yet be pressed between surfaces 43 and 73, and projection 44 will be in contact with the upper surface of the material.

Then die 30 is lowered toward die 60 against the pressure of rods 23. While portion $W_1$ is strongly pressed by dies 31 and 61, the central die 41 will lower to press portion $W_2$ onto die 71, and both front and back surfaces will be strongly pressed and held by surfaces 43 and 73. Projections 44 and 74 bite into the front and back surfaces of a second boundary part of material W on the outer peripheral portion of portion $W_2$ and, in this part, symmetrical stepped parts $B_9$ and $B_{10}$ (FIG. 5) will be formed by plastic deformation while hot.

Figure 3:
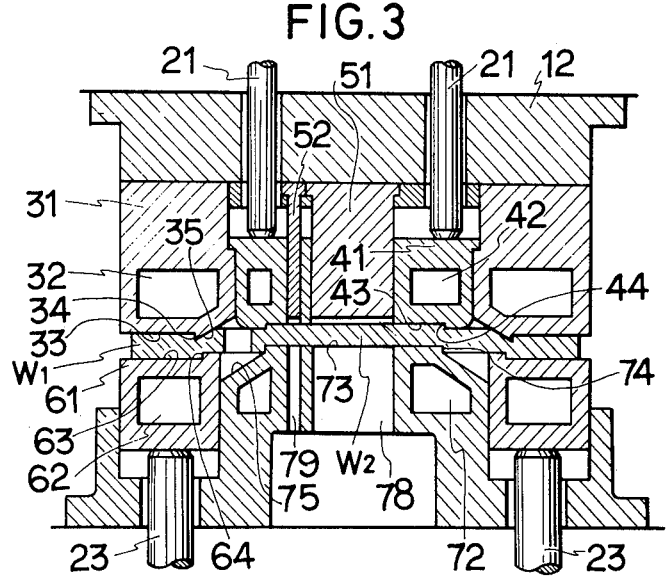
Figure 4:
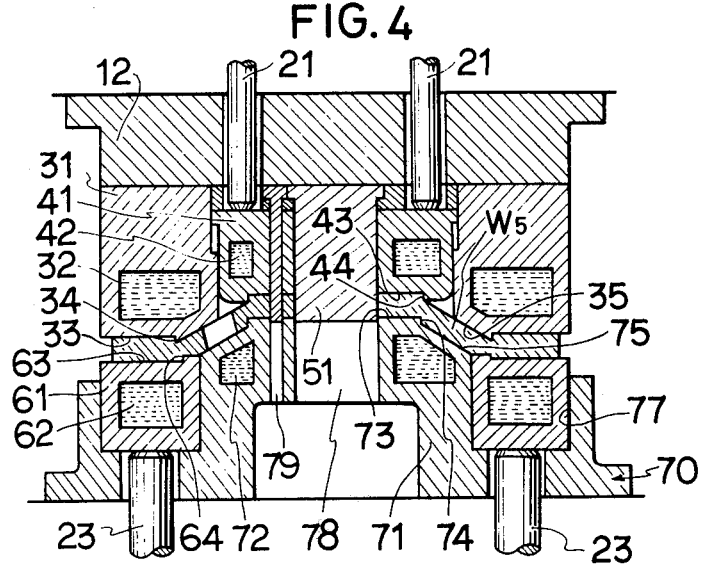
FIG. 4 is a view of only the essential part showing the material press-quenched.

As shown in FIG. 3, portion $W_1$ is strongly pressed and held by dies 31 and 61 on the outer peripheral side. Portion $W_2$ is strongly pressed and held by dies 41 and 71, and the pressing by dies 41 and 71 will be continued by rods 21 connected with the cylinder.

While portions $W_1$ and $W_2$ required to have flatness and parallel precision are thus strongly pressed and held, and the projections bite into the boundary parts of the material surfaces, either the upper and lower dies on the outer peripheral side or central upper and lower dies are moved relative to one another in the vertical direction.

In this embodiment, the outside dies 31 and 61 are moved downwardly with respect to dies 41 and 71.

By the action of the female surface 35 and the male surface 75, an intermediate portion $W_5$ (FIG. 4) between portions $W_1$ and $W_2$ is drawn and shaped to be truncated conically. At the time of this drawing shaping, portions $W_1$ and $W_2$ will tend to be pulled and deformed. However, as portions $W_1$ and $W_2$ are strongly pressed and held between dies 31, 41 and 61, 71 and the projections 34, 64 and 44, 74 bite into the boundary parts of the material W, the structure of the material will be positively prevented from being pulled, and only portion $W_5$ will be pulled, drawn and shaped to be thin.

Together with the above, with the fall of die 41 at the time of drawing shaping, the punches 51 and 52 also move down to punch portion $W_5$ to shape holes $B_3$ and $B_4$.

While the pressing continues, cooling water is fed through passages 32, 62, 42, 72 to quench and harden the hot-shaped material.

Thus, brake disk B as shown in FIG. 5 will be obtained. The surface of portion $B_1$ is ground by buffgrinding or the like, and the surface of portion $B_2$ is painted to obtain a final product.

In the above embodiment, a material in which the window holes $W_6$ are made in advance is used for the material W. However, a material in which the axle inserting hole and hub fitting holes other than these window holes are made in advance may be used and may be only pressed, held, drawn, shaped and quenched in the required portions.

In the above, the outer peripheral dies are moved. Alternatively, the inner dies may be moved. Further, both inner and outer dies may be made movable.

In the above shaping, portions $B_1$ and $B_2$ are strongly pressd by the upper and lower dies and held parallel and flat, and the projections will bite into both front and back surfaces of the material structure. At the time of drawing shaping, the structures of portions $B_1$ and $B_2$ are not pulled or slipped at all, the precision of the flatness and parallelism of these portions is kept high, and the shaping is made while the uniform structure is kept as it is. In punch shaping, a punching work high in precision and requiring no subsequent correction can be made without being influenced by drawing shaping. This is also the same when the material is punched in advance.

At the time of the above-mentioned shaping, slip and collapse of the structure is prevented by projections 34, 64, 44, 74. Because the outer peripheral projections 34 and 64 are displaced from each other in the radial direction with respect to the material, the upper projection 34 is in the form of a ridge of an acute angle and the lower projection 64 is vertical, they act as follows when shaping step parts $B_7$ and $B_8$. By projection 34 biting vertically into the back surface of the material and the slope, the structure is pressed toward the surface side and is slipped toward the slope. As projection 64 is on the inner periphery, is positioned in the slipping direction, and receives the slip of the structure with the vertical portion, the stepped part $B_8$ on the surface side will be vertically shaped. After part $B_8$ is shaped, even if it is exposed on the surface, it will not be necessary to mechanically work it to increase its appearance. As boundary parts are formed between the stepped parts $B_7$, $B_8$ and $B_9$, $B_{10}$ (FIG. 5) on the front and back surfaces and the drawn shaped intermediate portion $B_5$, and the slip of the structure is produced in such parts, there is also an effect of effectively absorbing the springing back of the shaped product. Projections 34 and 64 are displaced from each other in the radial direction, but the projections 44 and 74 may be formed in the same manner.

We claim:

1. A method of forming an integrally-shaped brake disk for a vehicle, comprising the steps of:

heating a brake disk material to a quenching temperature or a heating temperature range set from the hardness required for said brake disk;

maintaining said material heated while inserting said heated material between upper and lower dies of a brake disk forming apparatus;

strongly pressing and holding the outer peripheral portion and central portion of said material with outer and inner movable upper and lower dies;

biting both front and back surfaces of a first boundary part between an intermediate portion and said outer peripheral portion of said material and a second boundary part between said intermediate portion and central portion of said material, by inner peripheral projecting portions and outer peripheral projecting portions of said outer and inner upper and lower dies;

drawing and shaping the intermediate portion between said central and outer peripheral portions of said material by relative vertical motion between either inner or outer upper and lower dies, while said central and outer peripheral portions of said material are maintained pressed and held; and continuously quenching said material while it is maintained pressed and held by said outer and inner upper and lower dies.

2. A method according to claim 1, wherein:

said material is strongly held and pressed in said outer peripheral portion and central portion with said outer and inner movable upper and lower dies while being maintained substantially parallel and flat on both the front and back surfaces of said outer peripheral and central portions of said material; and said first boundary part is bitten in by radially displaced inner peripheral projecting portions of said outer upper and lower dies.

3. A method according to claim 1, wherein:

first and second stepped parts are formed on both said front and back surfaces of said first and second boundary parts respectively of said material in response to said biting of said material by said projecting portions of said inner and outer upper and lower dies.

4. A method according to claim 1, wherein:

said material is punched in advance to shape window holes in said intermediate portion between said outer peripheral portion and central portion.

5. A method according to claim 1, wherein:

an axle inserting hole and hub fitting holes are shaped by punching in said central portion of said material together with said drawing shaping.

6. A method according to claim 1, wherein:

said intermediate portion is drawn and shaped by moving the upper and lower dies of said outer peripheral portion in the vertical direction while said central portion of said material is held and fixed and said outer peripheral portion is held.

7. An apparatus for forming an integrally-shaped brake disk for a vehicle, comprising:
  first means for pressing and holding the central and outer peripheral portions of a heated brake disk material;
  second means for biting both front and back surfaces of a first boundary part between an intermediate portion and said outer peripheral portion of said material and a second boundary part between said intermediate portion and central portion of said material;
  third means for drawing and shaping the intermediate portion between said central and outer peripheral portions of said material by relative motion between predetermined ones of said dies while said central and outer peripheral portions of said material are maintained pressed and held; and
  fourth means for continuously quenching said material while it is maintained pressed and held.

8. An apparatus according to claim 7, wherein:
  said first means includes first upper and lower dies, at least one of which dies is movable, on the outer peripheral side for holding and pressing both front and back surfaces of the outer peripheral portion of said material;
  said first means includes second upper and lower dies in the central portion for holding and pressing said central portion of said material, at least one of which second dies is made movable;
  the dies of one of said first and second inner and outer sets of said dies being made movable in the vertical direction with respect to the dies of the outer set; and
  said third means includes a drawing shaping portion provided in the intermediate portion between said upper and lower dies of said first and second inner and outer sets, and the material being made quenchable.

9. An apparatus according to claim 8, wherein:
  said second means comprises projections provided on the opposed surfaces of said upper and lower dies.

10. An apparatus according to claim 9, wherein:
  said projections are displaced in the radial direction on said upper and lower dies.

11. An apparatus according to claim 9, wherein:
  the projections provided as opposed to each other on the inner peripheral portions of the opposed holding and pressing surfaces of said first upper and lower dies on the outer peripheral side are displaced from each other in the radial direction.

12. An apparatus according to claim 11, wherein:
  of said projections provided on said first upper and lower dies on the outer peripheral side, the projection on the back surface side of the shaped product is formed to have an acute angle, and the projection the front surface side is formed to be vertical to the holding and pressing surface.

13. An apparatus according to claim 8, wherein:
  punching means for shaping an axle inserting hole and hub fitting holes are provided in said second dies of said central portion.

* * * * *